Dec. 12, 1967  M. F. CONNORS  3,357,200

PORTABLE ICE MAKER

Filed Sept. 9, 1966

3,357,200
PORTABLE ICE MAKER
Myles F. Connors, New Suffolk Ave., P.O. Box 1227,
Mattituck, N.Y. 11952
Filed Sept. 9, 1966, Ser. No. 578,264
8 Claims. (Cl. 62—349)

This invention relates to an improved portable ice making machine and is an improvement over United States Patent Number 3,226,944.

It is an object of this invention to provide novel means for freezing and for subsequent release of the frozen cubes.

It is another object to provide a novel water reservoir and manner of filling the ice making chamber.

Figure 1:
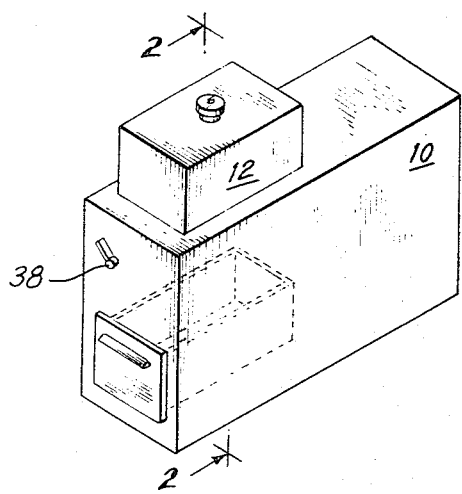
Figure 2:
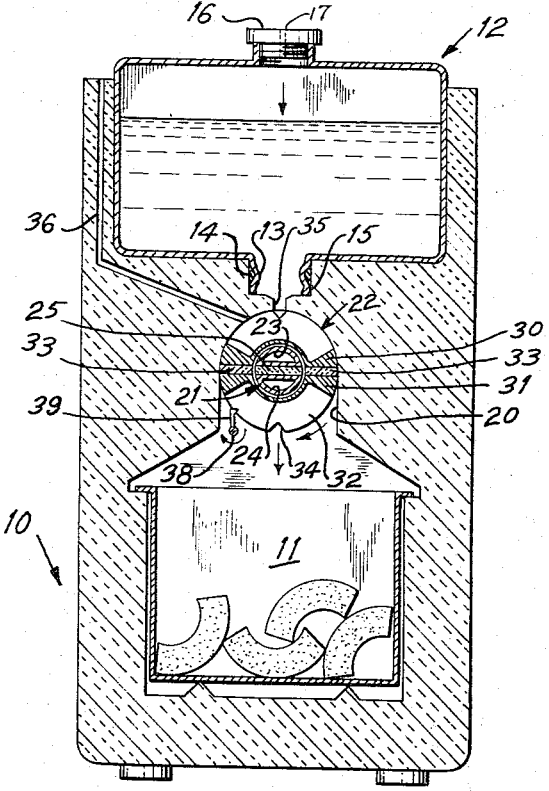
Figure 3:
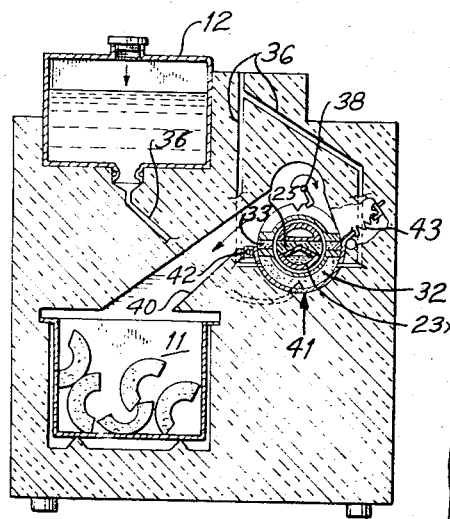
Figure 4:
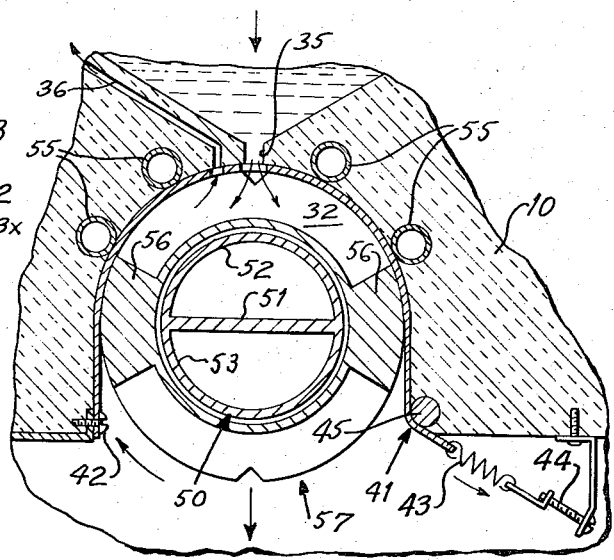

These and other objects of this invention will become apparent upon reading the following disclosure of several illustrative embodiments shown in the accompanying drawing in which;

FIG. 1 is a perspective view of the invention,
FIG. 2 is a section view taken on line 2—2 of FIG. 1,
FIG. 3 is a section view of a modification, and
FIG. 4 is an enlarged detail section view of the freezing and releasing means of still another modification.

Turning to the drawing, a preferably molded insulated cabinet 10 of foam plastic, rubber and the like and having a removable drawer 11, is provided with a removable water reservoir 12.

The cabinet 10 is molded with a suitable cavity to receive the reservoir 12 with its outlet spout 13 having a gasket 14 thereon disposed in a cylindrical spout well 15. The top wall of the reservoir 12 (FIG. 2) is provided with a round screw threaded cap 16 having an aperature 17 and which function as fill cap and vent.

The cabinet 10 is provided with a semi-cylindrical refrigeration chamber 20 in which is disposed a centrally located, stationary longitudinal cylindrical refrigerant tubular element 21, about which there is disposed a selectively rotatable multi-fin ice cube making element 22.

The tubular element 21 consists in this modification of three parts, namely, a top semi-cylindrical refrigerant tube 23, a bottom semi-cylindrical heat tube 24 and a flat strip of insulating material 25 disposed therebetween. Tubes 23 and 24 are made of metal such as aluminum, copper and the like and the insulating strip 25 is preferably made of plastic. The tubes 23 and 24 are secured to the insulating strip 25 preferably by use of suitable conventional adhesive material.

The multi-fin element 22 is also made of two like longitudinal half sections 30 and 31 having a semi-cylindrical channel and having spaced-apart fins 32 thereon to form ice cube making cubicles as in United States Patent Number 3,226,944. The channels of the half sections 30 and 31 of the ice making element 22 are disposed about the refrigerent element 21 with a strip of insulating material 33 disposed on each side. The insulating material 33 is preferably made of plastic as in the case of the material 25.

The separate fin elements 30 and 31 are made of metal preferably aluminum. The several fins 32 of both the elements 30 and 31 are provided with a suitable V-notch 34 to permit flow of water from the spout 13 of the reservoir through a single aperture 35 in the cabinet into the fin chambers. In short, the V-notches form a passageway permitting flow of water from one fin chamber to the next until all are filled with water. A vent line 36 is provided to permit venting of the air disposed by the water in filling the fin chambers.

In operating the device of FIG. 2, the refrigerant in tube 23 freezes the water in fin element 30. The cube making element 22 is then turned over and the element 30 is then exposed to heat from element 24, said heat being for example, that of the compressor used to compress the refrigerant gas or it may be from electrical heating elements. Simultaneously as the cubes are being released from element 30, the element 31 now being uppermost is being filled with water. Thus in the operation of the device of FIG. 2, freezing and thawing are continuously effected.

The released ice drops into drawer 11. However, to be certain that all the ice drops out of the fin compartments, an ice removal element may be added. This element consists of a rod 38 extending the length of the cabinet 10 and is provided with a plurality of leaf spring hooked fingers 39, one for each ice cubicle, each finger being adapted to scrape the surface of the ice in a respective cubicle on rotation of rod 38. Rod 38 may be manually operated by a hand crank or it may be electrically driven.

Turning now to the modification of FIG. 3, there is shown a manner of using the refrigerant tube 23X as the lowermost tube portion of the central element 21. In this modification the ice formed is removed from the top and slides down a chute 40 into drawer 11. The advantage of using the refrigerant tube lowermost is that use of liquid refrigerant is made possible. And since liquid refrigerant having more bulk removes the heat from water more rapidly and more efficiently, it is a very desirable way for removing the heat from the water. In the modification of FIG. 3 the water is introduced into the fin chamber from the bottom side of fin element 22.

It has been found desirable to use a sheet apron 41 of semi-cylindrical configuration about the lower half of fin element 22. The apron 41, shown in detail in upright form in the modification of FIG. 4, which may be made of metal, plastic or the like, is provided with a central aperture for the single water supply conduit 35.

As will be seen in FIG. 4, the apron 41 is bolted by bolts 42 to the interior of cabinet 10, and it is tautly disposed over the half portion of a fin element in firm contact with the edges of the fins 32 thereof.

In order to obtain a correct tautness to prevent water leak between the apron 41 and the various contacting edges of the fins 32, a tension spring 43 is used which is bolted by adjustable bolt 44 to the cabinet 10. A cylindrical guide rod 45 is used to obtain the correct wrap around the element 22. Use of the apron 41 allows for expansion of the ice during freezing and provides a smooth surface against which the fins 30 rub during rotation of element 22.

The operation of the device of FIG. 3 is a simultaneous freezing releasing operation as in the device of FIG. 2 since insulators 25 and 33 are employed to separate the heat metals from the cooled metals. In this FIG. 3 modification the use of the rod 38 and its spring fingers 39 is mandatory since there is positive mechanical removal of the heat release ice cubes from the cubicle fin compartments.

Turning now to the modification of FIG. 4, there is shown the use of an apron 41 with a gravity drop form of release. Also in this modification a round metal tube 50 is extruded with a center separator wall 51. Thus the central refrigerant tube is intermittently operated first with refrigerant in the top semi-cylindrical portion 52 to freeze the ice and later by application of heat in tube portion 53 to release the ice formed.

Also shown in FIG. 4, is the use of a plurality of refrigerant tubes 55 disposed in parallel longitudinal relationship to the central tube 50, said tubes 50 being embedded in the insulator cabinet 10 and contacting the metal apron 41 engaging the fin chambers.

In this manner, extremely rapid freezing of the water in the cubicles is possible and quick release is also possible since the heat of the water introduced in the top also passes through the metal webs 56 of integral fin freezer element 57.

I claim:
1. In a portable ice making machine having a cabinet, a reservoir for water and having a stationary central refrigerant cylindrical tubular element and a selectively rotatable multi-fin ice cube making element disposed about said stationary element, the improvement comprising dividing said central refrigerant element into a pair of semi-cylindrical tubes one tube adapted for refrigerant use to freeze ice in the multi-fin element and the other and opposite tube adapted for heat use upon the selectively rotated multi-fin to release the ice cubes formed.

2. The machine of claim 1 wherein the refrigerant element is a pair of separate semi-cylindrical tubes separated by a single flat insulator and wherein the multi-fin element is separated by a pair of opposed insulator strips adapted for use in linear alignment with the insulator of said refrigerant tube.

3. The machine of claim 1 wherein the refrigerant element is a cylindrical tube having an integral diametrical wall separating said tube into a pair of semi-cylindrical tubes.

4. The machine of claim 2 comprising a removable water reservoir container having a single outlet spout, said cabinet having a single water conduit leading from said spout to said multi-fin element, said multi-fin element having notches in the rim of the fins intermediate the ends to permit passage of water.

5. The machine of claim 3 comprising a removable water reservoir container having a single spout, said cabinet having single water conduit leading from said spout to said multi-fin element, said multi-fin element having notches in the rim of the fins intermediate the ends to permit passage of water.

6. The machine of claim 5 comprising a longitudinal plural apertured semi-cylindrical apron disposed slidably upon the fins of said multi-fin element adjacent said refrigerant element with one of said apertures of the apron engaging said water conduit and another a vent conduit, and spring tension means secured to one end of said apron to maintain said apron in water tight relationship to said fins.

7. The machine of claim 4 comprising a longitudinal plural apertured semi-cylindrical apron disposed in sliding contact upon the fins of said multi-fin element adjacent a substantially semi-cylindrical refrigerant tube disposed beneath said heat tube and separated from said refrigerant tube by said insulator, said water conduit engaging a pre-selected aperture of said apron to permit filling of a depending fin element disposed beneath said refrigerant tube; spring tension means for holding said apron tautly to said fins, said cabinet having a sloped chute leading from an ice drawer to said multi-fin freezing element, and a plurality of spring fingers disposed on a rotatable rod over said multi-fin element and adapted to engage the ice cubes for removal to said chute.

8. The machine of claim 6 comprising a plurality of longitudinal auxiliary refrigerant tubes disposed in said cabinet parallel to said central refrigerant element and engaging a metal apron to effect very rapid ice formation.

References Cited
UNITED STATES PATENTS

| | | | |
|---|---|---|---|
| 2,846,685 | 8/1958 | Galin | 62—353 X |
| 3,055,185 | 9/1962 | Lundstrom | 62—352 X |

ROBERT A. O'LEARY, *Primary Examiner.*

W. E. WAYNER, *Assistant Examiner.*